No. 670,347. Patented Mar. 19, 1901.
J. H. MOORE & J. BUCHANAN.
WHEEL PLOW.
(Application filed Aug. 17, 1900.)
(No Model.)
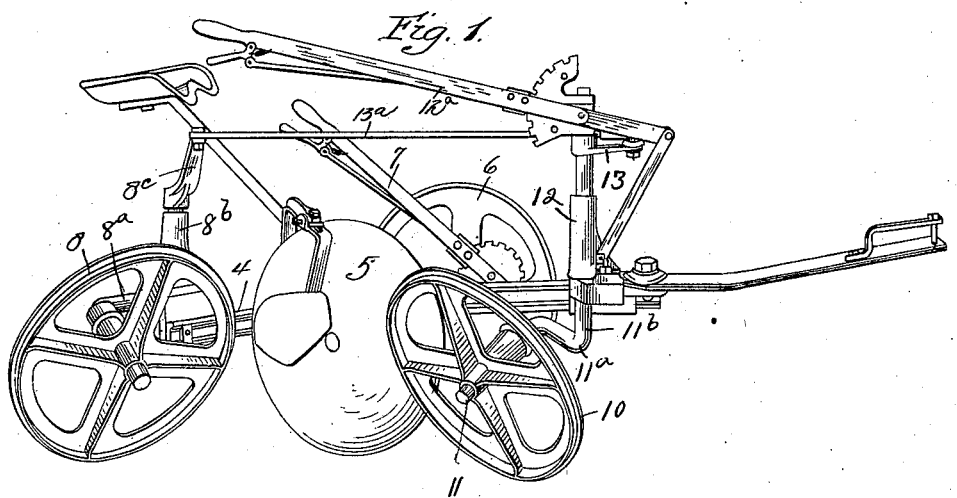
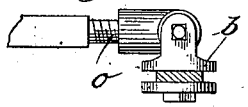
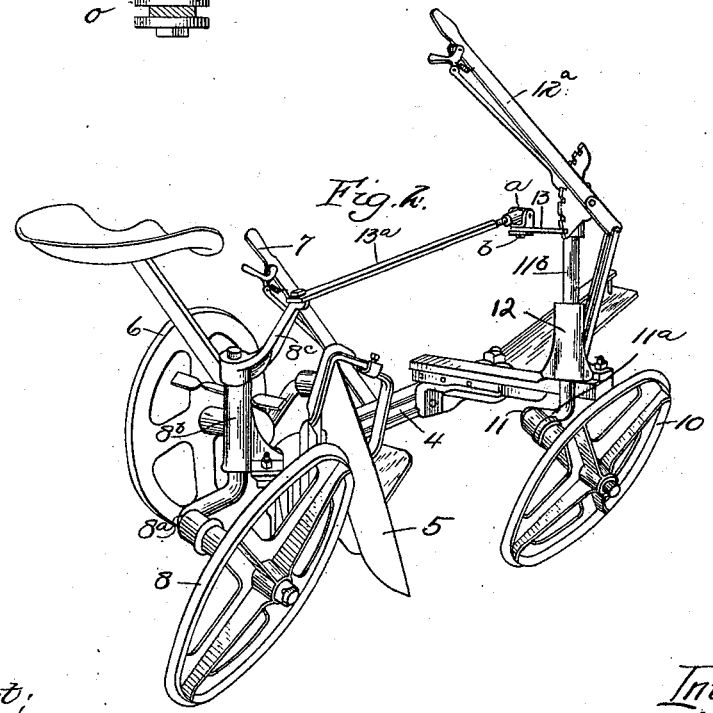
Attest:
C. Middleton
A. L. Middleton
Inventors,
Josiah H. Moore
Judson Buchanan
by Ellis Spear
Atty.

UNITED STATES PATENT OFFICE.

JOSIAH H. MOORE AND JUDSON BUCHANAN, OF CHATTANOOGA, TENNESSEE, ASSIGNORS TO THE CHATTANOOGA PLOW COMPANY, OF SAME PLACE.

WHEEL-PLOW.

SPECIFICATION forming part of Letters Patent No. 670,347, dated March 19, 1901.

Application filed August 17, 1900. Serial No. 27,165. (No model.)

*To all whom it may concern:*

Be it known that we, JOSIAH H. MOORE and JUDSON BUCHANAN, citizens of the United States, residing at Chattanooga, Hamilton county, Tennessee, have invented certain new and useful Improvements in Wheel-Plows, of which the following is a specification.

Our invention relates to improvements in wheel-plows, and is designed more especially for application to or embodiment in wheel-plows of that class known as "disk plows."

The object of the invention is to provide a simple and effective form of plow which, without the use of a tongue, will move forward in a straight line while making the furrow and which is capable of being easily and quickly turned at the ends of the furrow.

To this end the invention consists in providing a front furrow caster-wheel.

The invention further comprises a wheel-plow having front and rear furrow caster-wheels connected to turn automatically in opposite directions, and, finally, the invention includes the features of construction hereinafter described, and particularly pointed out in the claim.

The invention is illustrated in the accompanying drawings, in which—

Figure 1 is a side elevation of a disk plow constructed in accordance with our invention, and Fig. 2 is a perspective view. Fig. 3 is a detail view.

Referring more particularly to the figures, the numeral 4 indicates the frame of the plow carrying a disk plow 5, of the usual or any desired construction.

6 indicates a land-wheel connected to the frame in the usual manner, a lever 7 being provided whereby the plow may be raised and lowered in the manner well understood by those accustomed to the use of such devices. A rear furrow-wheel is shown at 8, which is in the form of a trailing caster-wheel, having its axle $8^a$ extending forward and then upward through a tubular fitting $8^b$, in which it is adapted to rotate, it being provided at its extremity above said fitting with a crank-arm $8^c$, adapted to be connected with the forward furrow or caster wheel, in the manner hereinafter explained.

It will be understood that the plow-frame, land-wheel, and rear caster-wheel are not new in themselves, and a more detailed description of them is therefore not necessary in the present specification.

The front furrow-wheel is indicated at 10 and is provided with an axle 11, which has a forwardly-extending portion $11^a$ and a vertical portion $11^b$, which is journaled in a tubular fitting or bracket 12, carried by the forward part of the plow-frame. By reason of the horizontal forwardly bent or extended portion $11^a$ a trailing motion is given to the furrow-wheel, thereby making it a caster-wheel, which will run straight as long as the horses are pulling in a forward direction, but which will turn readily when the line of draft is changed at the end of the furrow, thereby dispensing with the necessity of a guiding-tongue, such as usually employed, and permitting all guiding of the plow to be accomplished entirely by the draft.

A lever $12^a$ is provided whereby the forward portion of the frame may be raised and lowered relative to the forward furrow-wheel in substantially the usual manner.

In order to render the plow steadier and prevent any irregularities in the furrow unduly affecting the motion thereof, while not interfering with the ease of turning at the ends of the furrow, a crank-arm 13 is provided at the upper end of the vertical portion $11^b$ of the axle, which is connected by a rod $13^a$ with the crank-arm $8^c$ of the rear furrow-wheel, the said crank-arms extending in opposite directions, whereby in turning the plow said caster or furrow wheels will turn in opposite directions, but will ordinarily cause the plow to move steadily forward in a straight line. The rod $13^a$ is made adjustable, whereby the lead of the furrow-wheels may be changed, and a simple manner of accomplishing this is shown in the drawings, in which a socket *a* is hinged in a clip *b*, swiveled to the arm, the end of the rod being threaded to engage corresponding threads in the socket, whereby it may be screwed in or out to the desired extent.

Having thus described our invention, what we claim is—

In a wheel-plow, the combination with the frame and land-wheel, of a front and rear furrow-wheel, each of said wheels having its axle-support extending forward and upward with said upwardly-extending portion journaled in the frame whereby front and rear trailing furrow-wheels are provided, and a connection between said upwardly-extending portions whereby they are caused to turn simultaneously, substantially as described.

In testimony whereof we affix our signatures in presence of two witnesses.

JOSIAH H. MOORE.
JUDSON BUCHANAN.

Witnesses:
L. G. BROWNE,
S. G. TRIGG.